C. J. MUEHLMANN.
GAS CONTROL VALVE AND IGNITER.
APPLICATION FILED JULY 24, 1914.
1,144,427.
Patented June 29, 1915.
2 SHEETS—SHEET 1.
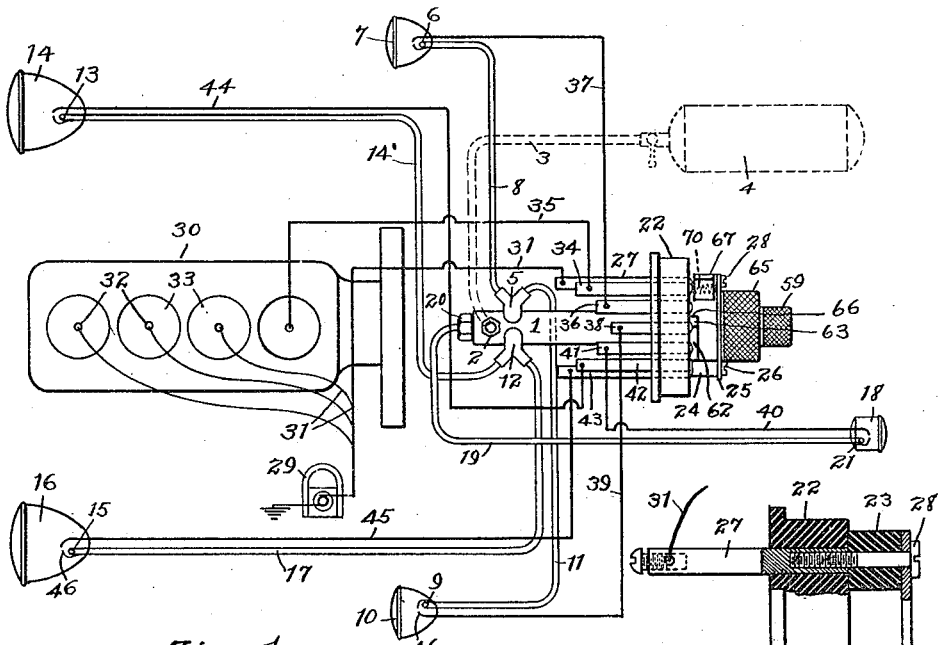
Fig. 1.
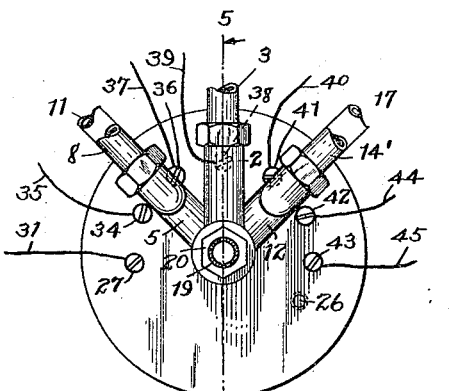
Fig. 2.
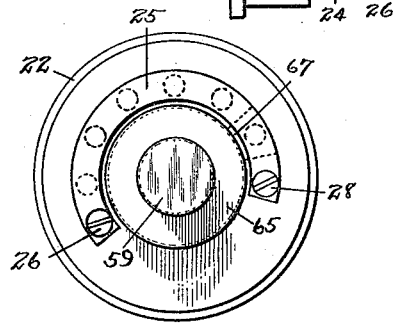
Fig. 4.
Fig. 3.
WITNESSES:
INVENTOR
CHARLES J. MUEHLMANN.
BY
ATTORNEY

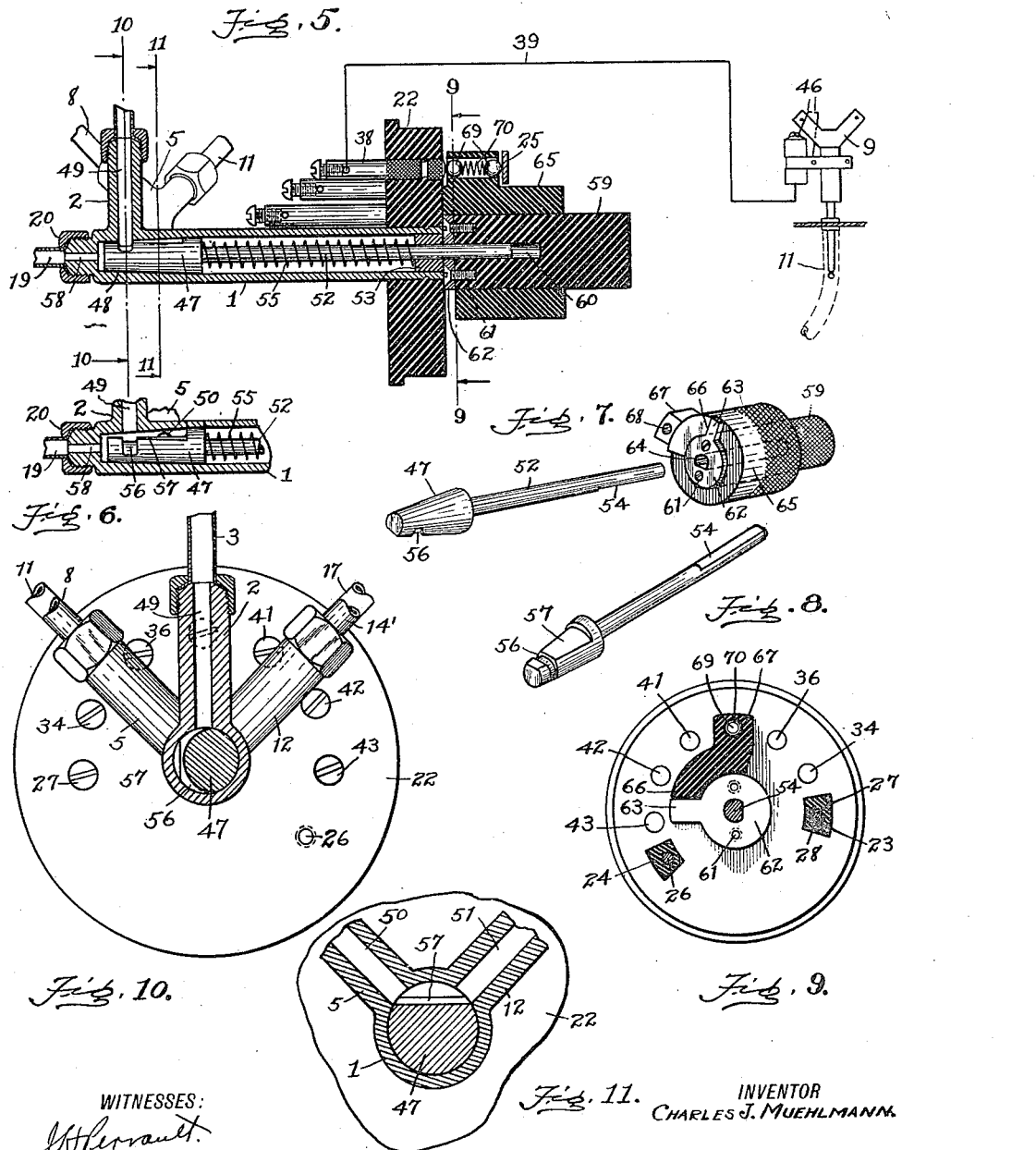

UNITED STATES PATENT OFFICE.

CHARLES J. MUEHLMANN, OF DETROIT, MICHIGAN.

GAS CONTROL VALVE AND IGNITER.

1,144,427.   Specification of Letters Patent.   Patented June 29, 1915.

Application filed July 24, 1914. Serial No. 852,947.

*To all whom it may concern:*

Be it known that I, CHARLES J. MUEHLMANN, a citizen of the United States, residing at Detroit, in the county of Wayne, State of Michigan, have invented certain new and useful Improvements in Gas Control Valves and Igniters; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a gas controlled valve and igniter for the lamps of motor vehicles, and consists in the novel construction and arrangements of parts as hereinafter fully set forth and pointed out particularly in the claims.

The main object of the invention is the provision of simple and efficient means for distributing the gas supply to the several lamps of a motor vehicle and for igniting the gas at the burners of the lamps through the simple manipulation of a combined gas controlled valve and electric igniting device so arranged as to be conveniently accessible from the driver's seat of the vehicle.

The invention further contemplates such a construction of the valve for controlling the gas supply and its operating means as will enable the distribution of the gas to one or more of the set of lamps of the vehicle, and in which the electric ignition system of the engine of the vehicle may be utilized to ignite the gas at one or more of the burners of the lamps, and also providing for the control of the entire set of lamps so that the flames of certain of the lamps may be dimmed or extinguished without affecting the remaining lamps, which may also be dimmed, extinguished or maintained at any degree of brilliancy desired.

The invention consists briefly in the employment of a gas distributing valve having a plurality of discharge passages connected through pipe lines and communicating with the burners of the head, side, and tail lamps of a vehicle, together with means for controlling an electric circuit derived from the electric ignition system of the engine of the vehicle and connected through a series of independent circuits, including a sparking gap in the circuit at the burner of each of the lamps, in which the circuits to the several lamps are successively closed through a rotative switch operatively connected with said valve, by means of which said valve is opened to admit a flow of gas to the burners of the lamps preceding the closing of the circuits to produce a spark at the burner for igniting the gas, said valve being unaffected through the reverse movement of said switch, and thereafter is free to be operated independently of said switch to control the supply of gas to the lamps and to dim, cut off, or regulate the flames as may be desired.

The preferred embodiment of my invention is illustrated in the accompanying drawings forming a part of this specification, in which:

Figure 1 is a diagrammatic plan view, showing the device embodying my invention as employed in connection with a set of lamps and with the electric ignition system of the engine of the vehicle. Fig. 2 is a rear end elevation of the device, showing the gas supply and distributing branches of the valve and the terminal connection of the ignition circuits with the insulated switch block. Fig. 3 is a front elevation of the device, showing the switch and valve actuating stems and the contact plate for distributing the electric energy to the several binding posts of the lamp ignition circuits. Fig. 4 is a fragmentary elevation of the insulated switch block, showing the contact plate insulated thereon and connected at one end with a binding post in the circuit of the ignition system of the engine. Fig. 5 is a vertical central section through the valve and switch, taken on dotted line 5—5 of Fig. 2, showing the valve in a partially opened position for admitting gas to certain of the distributing branches, and also showing the switch in position for closing one of the ignition circuits, at the lamp end of which an ordinary sparking device is shown connected with the burner of the lamp. Fig. 6 is a longitudinal fragmentary sectional view through the valve case, showing the valve therein in the full open position for delivering gas to all of the branches. Fig. 7 is a perspective view of the switch and valve actuating stem detached and showing the valve stem withdrawn from the actuating stem. Fig. 8 is a perspective view of the valve in a reverse position to that shown in Fig. 7, showing the circumferential and peripheral passages in the head of the valve for controlling the ports of the delivery branches. Fig. 9 is a transverse sectional view through the switch and valve stem taken on dotted line 9—9 of Fig. 5. Fig. 10 is a transverse sectional view through the valve, valve case and inlet passage therein, taken on dotted line 10—10 of Fig. 5. Fig. 11 is a transverse sectional view through the valve, valve case and both branches of the distributing or outlet passages thereof.

Referring to the drawings by the characters of reference marked thereon, and particularly to Fig. 1, 1 represents a tubular valve case which may be supported in any suitable manner, preferably to the dash of the vehicle not shown. Said valve case is provided at its inner end with a radially projecting inlet branch 2 adapted for connection with a source of gas supply through a valve controlled pipe line 3 communicating with a tank 4, as indicated by dotted lines. Spaced axially from said inlet branch 2 and extending radially from the valve case 1 is a dual outlet branch 5, which communicates with a burner 6 of a right-hand side lamp 7 through a pipe line 8 connected therewith and with the burner 9 of a left-hand side lamp 10 through a pipe line 11 connected therewith. An oppositely disposed dual outlet branch 12 communicates with the burner 13 of a right-hand head lamp 14 through a pipe line 14' and with the burner 15 of a left-hand head lamp 16 through a pipe line 17. A rear or tail lamp 18 is supplied with gas through a pipe line 19 connected at 20 with the end of the valve case 1 and with the burner 21 of said tail lamp.

Mounted on the outer end of the valve case 1 is a cylindrical switch block 22 of insulating material, preferably hard rubber, molded firmly upon the wall of the valve case. Mounted upon the face of the switch block 22, spaced apart and insulated therefrom at opposite ends by insulating blocks 23 and 24 respectively, is an annular segmental contact plate 25 secured at one end upon the block 24 by a binding screw 26 which passes therethrough and is threaded into the switch block 22. (See Fig. 4). The opposite end of said plate is electrically connected with a binding post 27, mounted in the switch block 22, by means of a binding screw 28 which passes through said plate and its insulating blocks 23, and is threaded into the end of the binding post 27 to form a contact between said plate and binding post to include said plate in the electric circuit.

As a means of utilizing the electric ignition system of the engine of the vehicle, which usually comprises a dynamo or magneto 29 associated with the engine 30, and having conductors 31 leading to the spark plugs 32 of the cylinders 33, by means of which the explosive charges are ignited in the cylinders of the engine. One of the conductors 31 normally leading to a cylinder of the engine is extended to the binding post 27, and from a binding post 34 mounted adjacent the post 27 and projecting through the switch block 22 a conductor 35 extends to the spark plug of said cylinder, whereby the circuit from the magneto to said cylinder is through the contact plate 26 and is normally closed by means for effecting a contact between said plate and the binding post 34, hereafter described.

Arranged in the arc of a circle and extending through the switch block 22, and projectly slightly upon the outer face of said block in line with the contact plate 26, is a plurality of binding posts spaced apart and adapted for connection with independent conductors to form the lamp circuits through which said cylinder circuit may be shunted for igniting the gas at the burners of the lamps. To enable the lighting of the lamps successively and in rotation with the delivery of gas thereto through the valve control (hereafter described) said conductors are arranged as follows: From the binding post 36 a conductor 37 leads to the burner 6 of the side lamp 7, and from the binding post 38 a conductor 39 extends to the burner 9 of the side lamp 10. The burner 21 of the tail lamp 18 is provided with a conductor connected to the binding post 41 and each of the head lamp burners 13 and 15 is connected respectively with the binding posts 42 and 43 by conductors 44 and 45. Each of these lamp circuit conductors is provided at the burner with the usual sparking electrodes 46, one of which is insulated and the other grounded to the burner of the lamp to form a gap for the passage of the spark, a common form of which is illustrated in Fig. 5.

To control the delivery of gas to the several lamps so that one or more of the lights may be maintained or extinguished, a tapering plug valve 47 (see Fig. 5) is rotatively seated in a tapered bore 48 in the valve case 1, with which the supply and delivery passages 49, 50 and 51 respectively of the branches 2, 5 and 12 communicate. Said valve is provided with a valve stem 52 which extends axially therefrom, and passing freely through a plug 53 seated in the end of the valve case 1 terminates in a flattened peripheral portion 54 projecting from the face of the switch block 22. The valve is held yieldably seated in the valve case under the tension of a compression coil spring 55 mounted on the stem 52, and interposed between the inner end of said valve and the plug 53 of the valve case 1. Extending radially and circumferentially of the valve near its tapered end is a semi-circular recess 56 adapted to register and communicate with the inlet passage 49 of the gas supply branch 2. Said recess 56 intersects and communicates with a peripheral passage 57 extending longitudinally of the valve and which communicates at the end of said valve with an axial passage 58 of the pipe line 19 leading to the tail lamp 18. Said valve passage 57 is adapted to register and communicate individually and collectively at certain positions with the outlet passages 50 and 51 of the dual branches 5 and 12 respectively, which in turn communicate with the respective pairs of side and head lamps 6 and 9, and 14 and 16.

Mounted on the end of the valve stem is a hand stem 59 having an aperture 60 formed centrally therein into which said stem projects. Secured to the inner end of said hand stem by means of screws 61 is a disk or plate 62 having a peripheral lug or extension 63 thereon, and provided centrally therethrough with a D-shaped aperture 64 adapted to coincide with and receive the angular end portion 54 of the valve stem so as to effect a rotative engagement with and permit of axial movement of the valve stem therein (see Fig. 7).

To provide for rotating the valve and for closing the lamp circuits, a cylindrical switch sleeve 65 of insulating material, and having a knurled peripheral surface to afford a hand grip, is rotatably mounted upon the hand stem 59 of the valve, and is provided upon its inner face with a shoulder 66 adapted to engage upon one side with the lug 63 of the plate 62 of said hand stem to effect a rotative engagement in one direction between said switch sleeve and valve. Projecting radially from the periphery of said valve sleeve is a lug or arm 67 which extends between the contact plate 25 and the ends of the binding posts of the switch block 22, and seated in the ends of an aperture 68 extending through the arm 67 are contact balls 69 which are forced outwardly by the tension of a coiled spring 70 interposed between said balls to form a yieldable contact conductor for closing the several circuits through engagement with the contact plate 25 and binding posts of said circuits (see Fig. 5).

The parts being in the position shown in Figs. 1 and 3, in which the supply and discharge passages of the valve case are closed by the body of the valve, and the cylinder circuit is normally closed through the engagement of the spring contact of the switch with the contact plate 25 and binding post 34, a rotary movement of the switch sleeve to the left, through the engagement of the lug 63 with the shoulder 66 of the switch sleeve, will rotate the valve 47 to cause the passage 56 therein to register with the supply passage 40 and admit a flow of gas first to the axial passage 58 communicating with the tail lamp 18, which lamp being usually farthest from the valve will require a greater length of time to enable the gas to reach the burner than the remainder of the lamps of the set, thus insuring gas at the burner at the time of closing the ignition circuit. A further movement of the switch sleeve will bring the passage 57 of the valve into registry with the passage 50 of the branch 5, as shown in Fig. 10, leading to the side lamps 6 and 9, so that when the contact of the switch shall have reached the binding post 36 to close the circuit 37 leading to the burner of said lamp, a spark will be produced to ignite the gas at said burner; and through a still further movement of said switch the circuit through the binding post 38 and conductor 39 will be closed to ignite the gas at the burner 9 of the companion side lamp 10. By this time the gas will have reached the tail lamp so that a further movement of the switch will close the circuit through the binding post 41 and conductor 40 to ignite the gas at the burner of said lamp. At this point the valve will have rotated sufficiently to register its passage 57 with the passage 51 of the branch 12 controlling the pair of head lamps 14 and 16, and the closing of the circuits to these lamps through the binding posts 42 and 43 and their respective conductors 44 and 45 by the further movement of the switch contact, sparks will be produced for igniting the gas at the burner of these lamps respectively, at which time the valve will have reached the position shown in Fig. 11, in which all of the passages are in full communication with the supply passage 49 through the valve passages 56 and 57. The switch sleeve is then returned to its extreme position to the right to again close and restore the cylinder circuit. The valve being held seated under the tension of its spring will be unaffected by the return movement of the switch and may then be manipulated through the hand stem 59 so as to dim or extinguish such of the lights as may be desired. For example, a further rotation of the valve to the left from the full-on position, as shown in Fig. 11, would serve to diminish the flow of gas through the passage 51 of the branch 12 leading to the head lamps to reduce the brilliancy or extinguish the lights, while the passage 57 of the valve head will maintain a full delivery of gas to the passage 50 of the branch 5 leading to the side lamps, as well as maintaining a flow of gas through the passage 58 to the tail lamp 18. A reverse movement of the valve will have the effect of diminishing or cutting off the supply of gas through the passage 50 leading to the side lamps, and a slight further rotation of the valve will effect the closing of passages 50 and 51 leading to the pairs of side and head lamps, while still maintaining a supply of gas for the tail light, due to the registering of the recess 56 of the valve with the supply passage 49 and the axial passage 58 through the passage 57 at the end of said valve in advance of the registering of the passage 57 with the passages 50 and 51 of the branches 5 and 12.

It will be seen by this arrangement of valve and means for its control, wherein the valve is actuated through the movement of the switch, and said switch and valve are rendered independently actuatable, that the lamps of the set may be so controlled individually and in pairs as to enable either pair of lamps to be lighted and maintained separately, and the tail light to be maintained independently of the remainder of the lamps, that the valve may be opened if desired independently and in advance of the closing of the ignition circuits through the switch, and that the switch may be actuated independently of said valve when said valve shall have been opened to re-light a set of lamps that may have been previously extinguished.

Having thus fully set forth my invention, what I claim as new, and desire to secure by Letters Patent, is:

1. In a gas control and igniting device, a plurality of lamps, each having a burner connected with a source of gas supply, an electric igniting system for the lamps comprising normally open circuits including sparking electrodes at the burner of each lamp, a valve case having a supply passage communicating with said source of gas supply and a plurality of delivery passages each communicating with the burner of a lamp, a valve rotatably mounted in said valve case to control communication between said supply passage and one or more of said delivery passages, an actuating member on said valve, a switch for controlling said electric ignition system having a contact member engaging said actuating member for opening said valve and for closing said ignition circuits, whereby said valve is independently operative of said valve for opening said circuits, and said valve is independently operative thereafter for closing one or all of said delivery passages and for maintaining communication with one or more of said passages.

2. In a gas control and igniting device, a plurality of lamps, each having a burner connected with a source of gas supply, an electric igniting system for said lamps comprising normally open circuits including sparking electrodes at the burner of each lamp, a valve case having a supply passage communicating with said source of gas supply, a delivery passage communicating with one of said lamps and a dual delivery passage communicating with each of a pair of said lamps, a valve rotatably mounted in said valve case and having passages therein for establishing communication with said supply passage and with said delivery passages individually and collectively, an actuating member on said valve, a switch for closing said open circuits mounted rotatably on said valve and having actuating contact arm thereon engaging said actuating member for opening said valve and for closing said circuits, whereby said valve is operative independently of said switch for restricting or closing said dual delivery passage and for maintaining or closing said remaining delivery passage.

3. In a gas control and igniting device, a plurality of lamps each having a burner connected with a source of gas supply, an electric igniting system for said lamps comprising normally open circuits including sparking electrodes at the burner of each lamp, a tubular valve case having a supply passage communicating with said source of gas supply, a delivery passage communicating with one of said lamps and a pair of dual delivery passages each communicating with a pair of said lamps, a valve rotatably mounted in said valve case and having passages therein for establishing communication with said supply passage and with said delivery passages individually and collectively, an actuating member on said valve, a switch for closing said open circuits rotatively mounted concentric with said valve and having means for contacting engagement with said actuating member for opening said valve when rotated to close said circuits and inoperative for closing said valve when actuated to open said circuits, means for yieldably retaining said valve against rotation, and a hand stem for rotating said valve independently of said switch for restricting or closing either or both of said dual delivery passages and for maintaining or closing said remaining delivery passage.

4. In a gas control and igniting device, a lamp having a burner connected with a source of gas supply, a source of electric energy, a normally open electric ignition circuit having sparking electrodes at the burner of said lamp, and adapted for connection with said source of electric energy, a valve case having supply and delivery passages, a valve seated to rotate in said valve case for controlling communication between said supply and delivery passages, a stem on said valve and a spring on said stem interposed between said valve case and said valve for yieldably retaining said valve against rotation, a hand stem for rotating said valve mounted on said valve stem, a projection on said hand stem, a switch for closing said ignition circuit rotatably mounted on said hand stem and having means for interlocking engagement with said projection for rotating said valve with the movement of said switch in one direction.

5. In a gas control and igniting device, a lamp having a burner connected with a source of gas supply, a source of electric energy, a normally open electric ignition circuit having sparking electrodes at the burner of said lamp and adapted for connection with said source of electric energy, a valve case having supply and delivery passages, a valve seated to rotate in said valve case for controlling communication between said supply and delivery passages, a stem on said valve and a spring on said stem interposed between said valve case and said valve for yieldably retaining said valve against rotation, an insulated switch block mounted on said valve case and having a contact plate thereon connected with said source of electric energy, a binding post in said switch block connected with said ignition circuit and adapted for connection with said contact plate, a hand stem mounted on said valve stem to rotate with said stem and having a radial projection thereon, a switch rotatively mounted on said hand stem and having a shoulder therein for engagement with the radial projection of said hand stem for actuating said valve with the movement of said switch, a radial projection on said switch carrying a spring tensioned conductor slidably engaging said contact plate and contacting with said binding post to close said ignition circuit with the movement of said switch to open said valve.

In testimony whereof, I sign this specification in the presence of two witnesses.

CHARLES J. MUEHLMANN.

Witnesses:
B. F. WHEELER,
M. E. BROESAMLE.

Copies of this patent may be obtained for five cents each, by addressing the "Commissioner of Patents, Washington, D. C."